Dec. 21, 1926.
H. W. SANFORD
1,611,240
JOURNAL BOX AND AXLE
Filed April 25, 1924     3 Sheets-Sheet 1
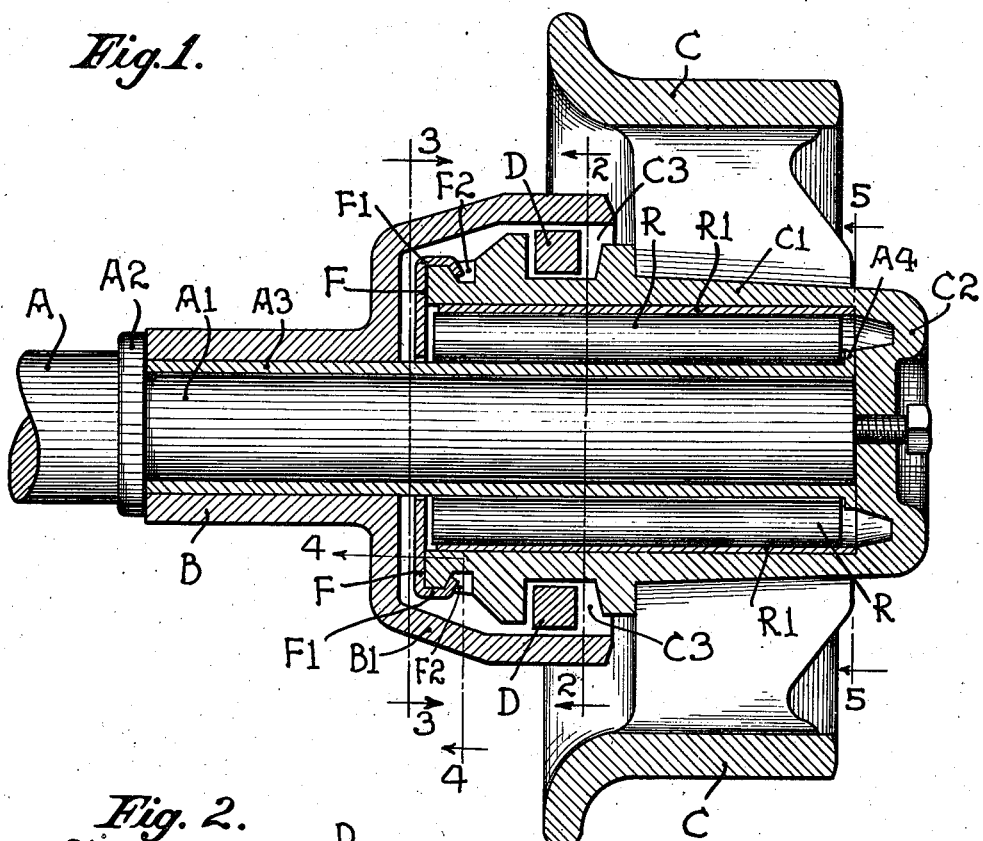
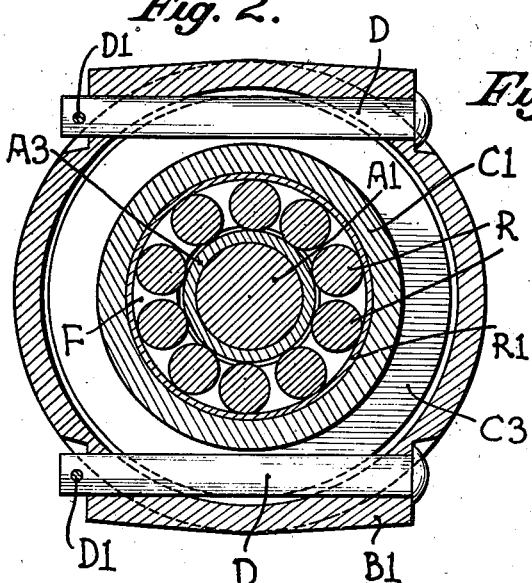
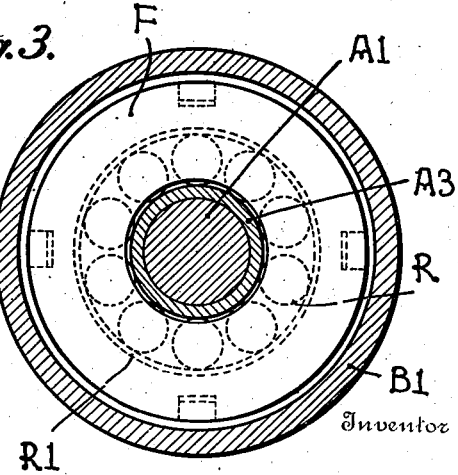
Inventor
Hugh W. Sanford
By Cyrus Kehr
Attorney

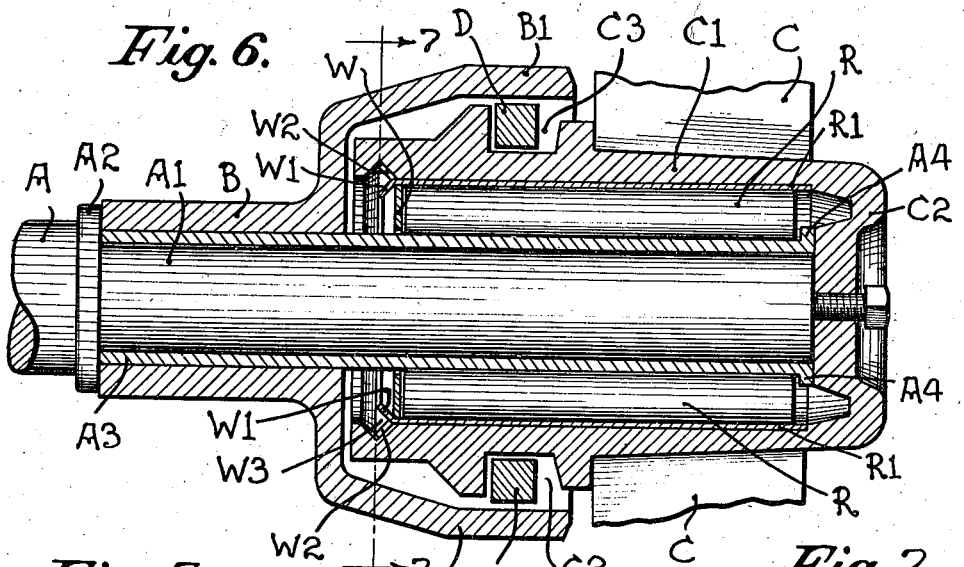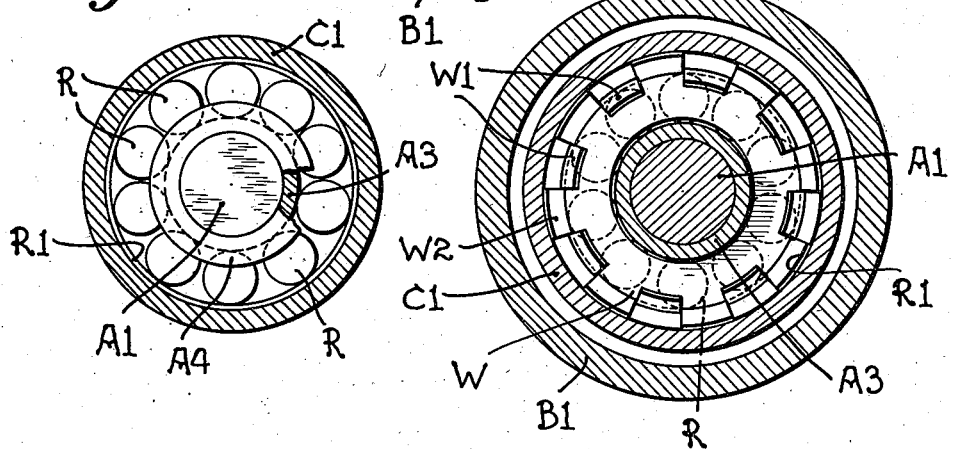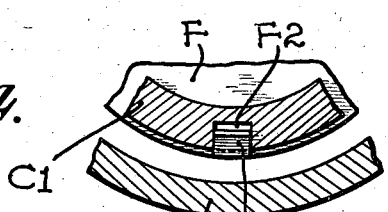

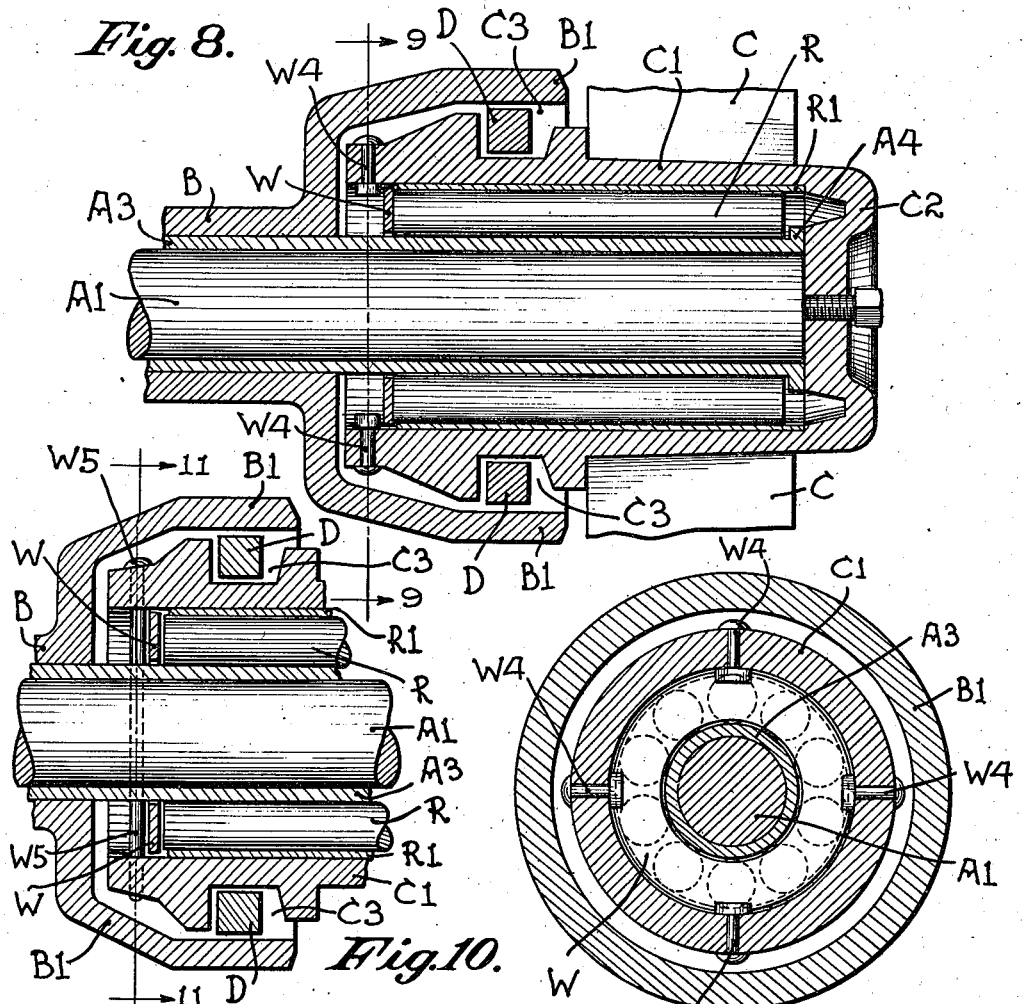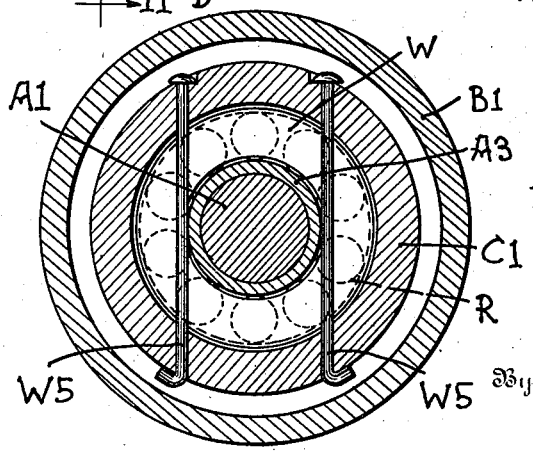

Patented Dec. 21, 1926.

1,611,240

UNITED STATES PATENT OFFICE.

HUGH W. SANFORD, OF KNOXVILLE, TENNESSEE.

JOURNAL BOX AND AXLE.

Application filed April 25, 1924. Serial No. 708,878.

This improvement relates particularly to the axles, axle boxings, and wheels of mine cars.

One object of the invention is to provide greater strength for a given thickness of axle and to provide a structure which will permit the removal of the wheel from the axle without displacing the anti-friction rollers ordinarily used in such wheels.

A further object of the invention is to provide a construction in which there is greater strength for a given diameter of the journal or axle.

An important feature of the invention is a sleeve which surrounds the part of the journal or axle which rests in the wheel hub and on and around which the anti-friction rollers of the bearing are arranged. Said sleeve is preferably longer than the wheel hub, as will be herein described. A structure comprising a sleeve in a general way like the sleeve of the present application is made the subject matter of my application for Letters Patent of the United States, Serial Number 652,585, filed July 19, 1923, for "journal boxes and axles". In the structure of that application, provision is made for engagement between the extreme outer end of the sleeve and the outer end of the wheel hub to cause the sleeve to be drawn off from the journal or axle when the wheel is removed from the journal or axle. Such a sleeve is also shown in my application, Serial Number 693,273, filed February 16, 1924, for a patent for "journal boxes and axles". In that application, provision is made for engagement between the inner end of the wheel hub and the adjacent part of the sleeve, whereby the sleeve is removed from the journal or axle when the wheel is removed.

In the construction of the present application, engagement is made between the outer end of the sleeve and the inner end of the hub through the medium of the anti-friction rollers forming a part of the hub bearing.

Such engagement may be made in different ways, as herein described.

In the accompanying drawings,

Fig. 1 is a longitudinal section in the upright plane extending along the axial line of one of the axles of the car;

Fig. 2 is an upright, transverse section on the line, 2—2, of Fig. 1, looking toward the left;

Fig. 3 is an upright, transverse section on the line, 3—3, of Fig. 1, looking toward the right;

Fig. 4 is an upright, transverse section on the line, 4—4, of Fig. 1, looking toward the right;

Fig. 5 is an upright, transverse section on the line, 5—5, of Fig. 1, looking toward the left;

Fig. 6 is a section of the hub and axle boxing on the same plane as the plane on which Fig. 1 is taken, the end cap being omitted and a washer being placed around the sleeve at the inner ends of the rollers;

Fig. 7 is an upright, transverse section on the line, 7—7, of Fig. 6, looking toward the right;

Fig. 8 illustrates other means for engaging the washer of Figs. 6 and 7;

Fig. 9 is a section on the line, 9—9, of Fig. 8, looking toward the right;

Fig. 10 illustrates still other means for engaging the washer of Figs. 6 and 7;

Fig. 11 is a section on the line, 11—11, of Fig. 10, looking toward the right.

Referring first to Figs. 1, 2, 3, 4 and 5, of the drawings, A is the axle, $A^1$ is the journal or the part of the axle which extends through the axle boxing and the wheel.

At the junction of the body of the axle, A, and the journal, $A^1$, is an annular shoulder or rib, $A^2$, which extends outward far enough to engage the adjacent end of the axle boxing, B. A sleeve or tube, $A^3$, extends around the journal, $A^1$, from the annular shoulder, $A^2$, outward to the end of the journal. C is the wheel. This has a hub, $C^1$, which has an end wall, $C^2$, extending across the end of the journal and bearing against said end. A tubular metal lining or shell, $R^1$, extends along the inner face of the hub. Between said lining and the sleeve, $A^3$, are antifriction rollers, R, which bear against said lining and said sleeve. The outer end of the sleeve, $A^3$, is provided with a flange, $A^4$, which extends partially across the ends of the rollers, R. Said flange may be formed by upsetting the end of the sleeve or by welding or shrinking a ring on the end of the sleeve.

A cap, F, surrounds the inner end of the hub and is fitted closely around the sleeve, $A^3$. Said cap has a marginal flange, $F^1$, extending over the periphery of the hub adjacent the end of the hub. Parts of the extreme edge of said flange are bent into recesses, $F^2$, formed in the hub, whereby said cap is immovably held in place on the end of the hub. The ends of the rollers, R, are so near this cap as to allow only small endwise play for the hub or the rollers. The axle boxing, B, is secured to the car bottom (not shown) in any desired manner. The main part of the axle boxing closely surrounds the sleeve, A³, while the outer end of the axle boxing is flared to form a flange, B¹, extending around the inner end of the hub, C¹, of the wheel, C.

In the part of the hub which is surrounded by the flange B¹, the hub has an external circumferential channel, C³. Above and below the hub a key, D, extends horizontally through the flange, B¹, and tangentially through the hub channel, C³, and is retained by a cotter, D¹. Said keys prevent the wheel and hub from moving horizontally outward away from the boxing, B.

When the wheel is to be removed, the keys, D, are first removed, whereby the wheel is disengaged from the boxing, B. Then the wheel may be drawn outward. But the cap, F, will bear against the inner ends of the rollers, R, and compel the rollers to move outward endwise simultaneously with said cap and the hub. At the same time, the outer ends of the rollers will bear against the flange, A⁴, and compel the sleeve, A³, to move outward with the rollers and the cap, F, and the hub, whereby the sleeve retains its position relative to the rollers, R, and keeps the rollers in position in the hub until such times as the wheel and sleeve are to be returned into their working position on the journal. When these parts are being so returned, the outer end wall, C², of the hub will bear against the outer end of the sleeve, A³, and compel said sleeve to move in unison with the hub.

In the form illustrated by Figs. 6 and 7, the cap, F, is omitted and a washer, W, surrounds the sleeve, A³, adjacent the inner ends of the rollers and within the lining, R¹. Parts, W¹, of the inner end of the lining are bent toward the sleeve, A³, and across the inner face of the washer, W, and similar tongues, W², on the inner end of said lining are bent outward away from the sleeve, A³, into recesses, W³, formed in the inner face of the hub. These tongues, W², by engagement in said recesses, compel the lining, R¹, to move outward with the hub when the wheel is to be removed from the journal. At the same time the tongues, W¹, compel outward movement of the washer, W, when the hub is moved outward. Such outward movement of the washer compels like movement of the rollers, R. As above described, in connection with Figs. 1, 2, 3, 4 and 5, such outward movement of the rollers causes like outward movement of the sleeve, A³.

In the form shown by Figs. 8 and 9, the washer, W, of Figs. 6 and 7 is used; but the washer is retained in position in the hub by means of bolts or rivets, W⁴, extending through the wall of the hub at the inner side of the washer. When the hub is moved outward, the heads of the rivets or bolts bear against the washer and force it to move with the hub.

In the form shown by Figs. 10 and 11, the washer, W, is again used and is held in place in the hub by means of two keys, W⁵, extending entirely through the hub at opposite sides of the journal, A¹, and close to the inner face of the washer. When the hub is moved outward for the removal of the wheel, these keys, W⁵, will compel the like movement of the washer and the rollers, R, and the rollers will compel the like movement of the sleeve, A³.

On examining the function of the sleeve, A³, it will be seen that said sleeve may be regarded as closely associated with or as forming a part of the wheel or wheel hub. When the keys, D, have been removed, the hub is free for removal from the journal, and by the engagement made between the sleeve and the hub through the rollers the sleeve is carried outward in unison with the hub and the rollers, R, whereby, as already pointed out, the rollers are kept in position. Combining the sleeve in this manner with the wheel and rollers makes the wheel self-contained or adapted to remain assembled when removed from the journal. In view of this relationship between the hub and the sleeve, A³, that sleeve may be regarded as an inner hub lining.

In addition to serving to retain the rollers, the sleeve also serves as a replaceable wearing member. If it becomes worn, it may be removed and a new sleeve substituted.

A further advantage of this construction is the added strength given to the structure for a given journal diameter. The part of the sleeve reaching through the axle boxing is virtually an extension of the wheel and avoids or reduces the localizing of transverse journal strains at the inner end of the hub. The sleeve serves to distribute such strains. Furthermore, this form of the sleeve permits its easy manufacture of high carbon steel tubing which will give greater strength than could be had from an equal cross section of the ordinary machine steel from which axles of this form are made. Thus an axle boxing of a given interior diameter may be a part of such a structure having greater strength than can be had without the use of the sleeve.

I claim as my invention,

1. The combination of a journal, a hub, an axle box, means engaging the hub and axle box, rollers and a sleeve in operative relation with each other for engagement at their outer ends, and means supported by the hub at the inner end of the hub for making engagement between the hub and the rollers, whereby, when the hub is removed, said engagement between the hub and the rollers and between the rollers and the sleeve will cause the outward movement of the sleeve with the hub, substantially as described.

2. The combination of a journal, a hub, an axle box, means engaging the hub and axle box, a sleeve surrounding the journal within the hub and the axle box and having at its outer end an annular outward-directed flange, rollers between the sleeve and the hub and adapted to engage said annular flange, and means supported by the hub at the inner end of the hub for making engagement between the hub and the rollers, whereby, when the hub is removed, said engaging means will force the rollers outward and the rollers will engage said flange and thereby cause the outward movement of the sleeve with the hub, substantially as described.

3. The combination of a journal, a hub, an axle box, means for holding the hub on the journal, rollers and a sleeve free from the journal and the hub in operative relation with each other for engagement at their outer ends, and means removably secured at the inner end of the hub for making engagement between the hub and the rollers, whereby, when the hub is removed, said engagement between the hub and the rollers and between the rollers and the sleeve will cause the outward movement of the sleeve with the hub, substantially as described.

4. The combination of a journal, a hub, an axle box, means engaging the hub and axle box, a sleeve surrounding the journal within the hub and free from the journal and the hub and having at its outer end an annular outward-directed flange, rollers between the sleeve and the hub and adapted to engage said annular flange, and means removably secured at the inner end of the hub for making engagement between the hub and the rollers, whereby, when the hub is removed, said engaging means will force the rollers outward and the rollers will engage said flange and thereby cause the outward movement of the sleeve with the hub, substantially as described.

In testimony whereof I have signed my name, this 23rd day of April, in the year one thousand nine hundred and twenty-four.

HUGH W. SANFORD.